Oct. 22, 1935.     D. H. WEST     2,017,999
HYDRAULIC ACTUATING MECHANISM FOR MACHINE TOOLS
Filed April 22, 1931     4 Sheets-Sheet 1
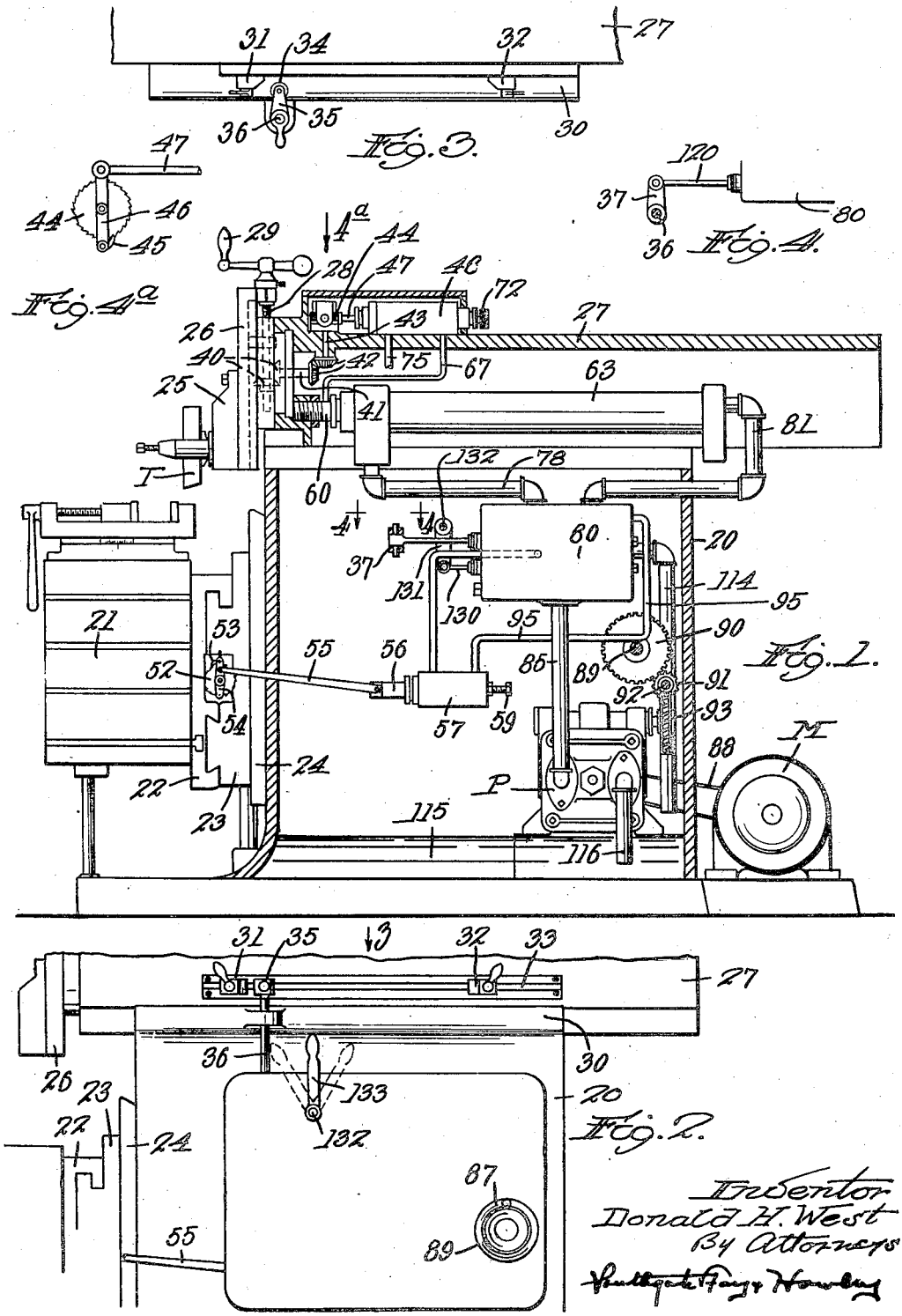
Inventor
Donald H. West
By Attorneys

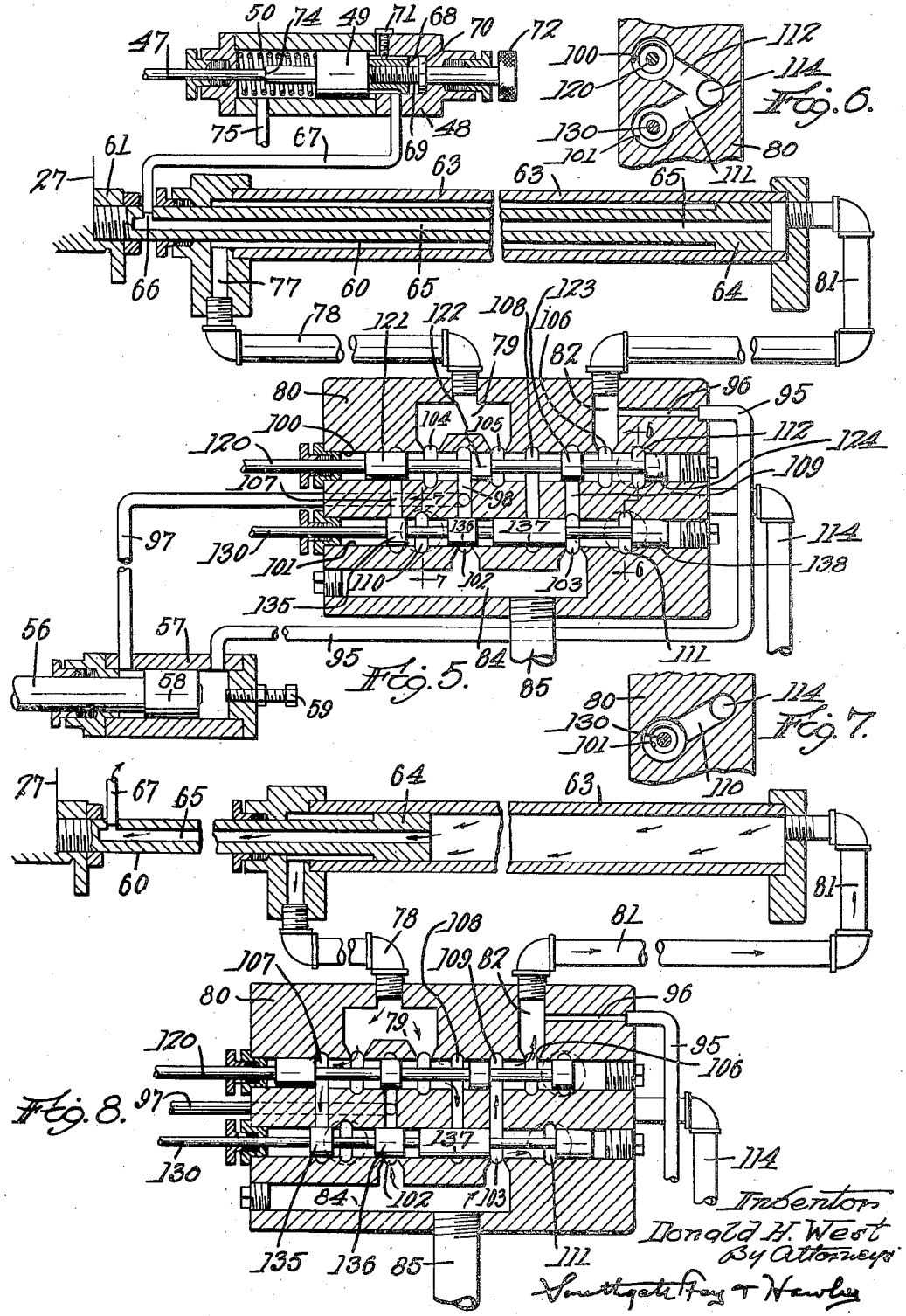

Inventor
Donald H. West
By Attorneys
Southgate Fay & Hawley

Oct. 22, 1935.   D. H. WEST   2,017,999
HYDRAULIC ACTUATING MECHANISM FOR MACHINE TOOLS
Filed April 22, 1931   4 Sheets-Sheet 4

Inventor
Donald H. West
By Attorneys

Patented Oct. 22, 1935

2,017,999

UNITED STATES PATENT OFFICE 2,017,999

HYDRAULIC ACTUATING MECHANISM FOR MACHINE TOOLS

Donald H. West, Marlboro, Mass., assignor to The Lapointe Machine Tool Company, Hudson, Mass., a corporation of Maine Application April 22, 1931, Serial No. 532,001

1 Claim. (Cl. 121—45)

This invention relates to actuating mechanism for a machine tool having a reciprocated tool carrier or work-supporting member, such as a shaper, planer or grinder.

It is the general object of my invention to provide improved hydraulic actuating mechanism for the reciprocated member in such a machine tool.

A further object is to provide hydraulic actuating mechanism so designed that the speed and working power of the reciprocated member may be varied without substantially changing the speed or the power consumption of the pump which supplies hydraulic pressure.

Another important feature of the invention relates to the provision of hydraulically actuated feeding means for the tool and work, operable in timed relation to the movement of the reciprocated member.

My invention further relates to arrangements and combinations of parts which will be hereinafter described and more particularly pointed out in the appended claim.

A preferred form of the invention is shown in the drawings, in which

Fig. 1 is a sectional side elevation of a shaper embodying my improvements;

Fig. 2 is a partial side elevation thereof;

Fig. 3 is a detail plan view, looking in the direction of the arrow 3 in Fig. 2;

Fig. 4 is a detail sectional plan view, taken along the line 4—4 in Fig. 1;

Figure 9:
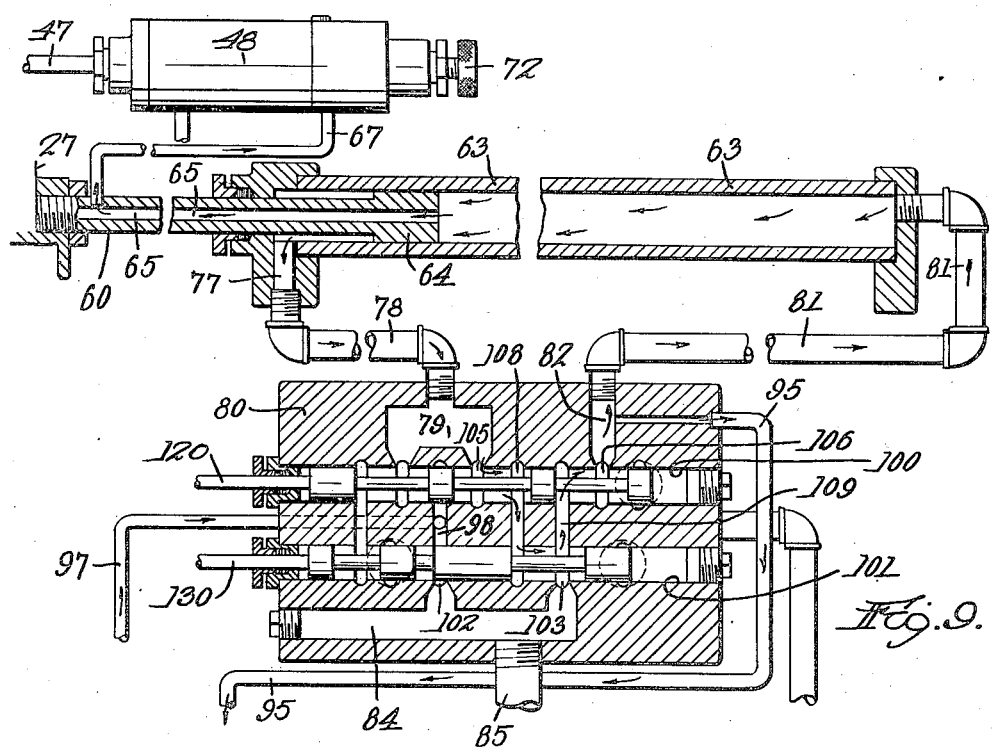

Fig. 4ª is a detail plan view, looking in the direction of the arrow 4ª in Fig. 1;

Fig. 5 is a sectional side elevation of the hydraulic mechanism and the control valves therefor;

Figs. 6 and 7 are detail sectional elevations, taken along the line 6—6 and 7—7 in Fig. 5, and Figs. 8 to 12 inclusive are sectional elevations similar to Fig. 5 but showing the parts in different operative relations.

Referring to Figs. 1 to 4, I have shown my invention embodied in a shaper comprising a bed or casing 20, and a work table or support 21 secured to a cross slide 22 which is slidably mounted on a support 23, which in turn is vertically adjustable in guideways 24 on the front of the casing 20.

A tool T is mounted in a tool holder 25 secured to a vertically movable tool holder 26. The holder 26 may be vertically adjusted manually in guideways on the front end of a ram 27 by means of a feed screw 28 and handle 29.

The ram 27 is slidable in guideways 30 (Fig. 2) formed on the bed or casing 20 and is provided with dogs 31 and 32, longitudinally adjustable in a slotted guide member 33 mounted on the side of the ram and movable therewith. The dogs 31 and 32 alternately engage a roll 34 (Fig. 3) on an arm 35 secured to the upper end of an upright shaft 36. An arm 37 (Fig. 4) is secured to the shaft 36 within the casing 20 and actuates a valve mechanism to be described.

The feed screw 28, which effects vertical feed of the tool holder 26, is connected by bevel gears 40 (Fig. 1) to a short shaft 41, which in turn is connected by bevel gears 42 to an upright shaft 43 having a ratchet wheel 44 secured to its upper end. The ratchet wheel 44 is intermittently advanced by a feed pawl 45 (Fig. 4ª) mounted on a feed lever 46 which has a pin and slot connection with a piston rod 47 extending into a cylinder 48 on the ram 27, and which is connected to a piston 49 (Fig. 5) in said cylinder. A spring 50 normally holds the feed pawl in withdrawn or initial position.

The cross feed of the work support 21 is effected by a feed screw having a ratchet wheel 52 (Fig. 1) mounted thereon and engaged by a feed pawl 53 pivoted on a feed lever 54. The lever 54 is connected by a link 55 to a piston rod 56 extending into a cylinder or casing 57 and connected to a piston 58 (Fig. 5 therein). A stop screw 59 adjustably limits the rearward or idle return movement of the piston 58, piston rod 56 and feed pawl 53.

A piston rod 60 (Figs. 1 and 5) is threaded into a lug or projection 61 on the inside of the ram 27 and extends through a suitable stuffing box into a main cylinder 63, where it is connected to a piston 64, preferably formed as an integral enlargement of the piston rod 60.

The rod 60 has an axial passage 65, open at the right hand or piston end, as viewed in Fig. 5, and closed at the left hand end where the rod 60 is threaded into the lug 61. A side outlet or port 66 is provided, however, at the closed left hand end, which port is connected by a pipe 67 to the rear end of the cylinder 48 which actuates the feed pawl for lowering the tool T.

When liquid under pressure is forced through the pipe 67 into the cylinder 48, the piston 49 is moved to the left against the pressure of the spring 50 to give the feed pawl a feeding movement. As soon as the pressure is relieved, the spring returns the piston to its right hand or initial position.

The limit of return movement is determined by engagement of the piston 49 with the end of a sleeve 68, threaded on an adjusting screw 69.

The screw 69 extends through a packing box in the end of the cylinder 48 and is provided with a flange 70 engaging the inner end of the cylinder. The sleeve 68 is held from rotation by a projection on the end of a screw 71, which projection extends into a longitudinal slot in the sleeve 68 and acts as a key therefor. The sleeve 68 is of less diameter than the internal diameter of the cylinder 48, thus affording an annular passage for the liquid delivered under pressure from the pipe 67.

By turning the knurled head 72 of the adjusting screw 69, the axial position of the sleeve 68 may be varied, thereby varying the amount of tool feed for each actuation of the piston 49. A shoulder 74 on the piston rod 47 limits feeding movement of the piston to the left. The left hand end of the cylinder 48 is provided with a vent or drain 75 always open to the atmosphere, so that the left hand end of the cylinder 48 is always at atmospheric pressure and any leakage past the piston 49 will be drained away.

The left hand end of the main cylinder 63 (Fig. 5) is provided with a port 77, connected by a pipe 78 to a recess or chamber 79 in a valve block 80. The right hand or rear end of the cylinder 63 is similarly connected by a pipe 81 to a recess or chamber 82 in the valve block 80. A pressure chamber 84 in the lower part of the valve block 80 is connected by a pipe 85 to the delivery port of a pump P, continuously actuated by a motor M.

The pump P may be of any suitable type but is preferably a multiple piston variable delivery pump of the type shown in my prior Patent No. 1,722,832, issued July 30, 1929. For the purposes of this application, it is only necessary to state that the pump is adapted to deliver oil or other liquid under pressure at a predetermined rate, which rate may be varied by turning the hand wheel 87 shown in Fig. 2, thereby varying the angular position of a support for a rotating plate which actuates the multiple pistons of the pump.

At any given manual setting, the pump will deliver a substantially constant and predetermined volume of liquid against any pressure within a reasonable range. For a more complete description of the pump, reference is made to my prior patent above mentioned.

The motor M may be connected to the pump P through a driving belt or chain 88, and the hand wheel 87 is connected to the pump through a shaft 89 (Fig. 1) gear 90, pinion 91, worm 92 and worm wheel 93.

The cross feed cylinder 57 is connected at its right hand end through a pipe 95 (Fig. 5) to a passage 96 in the valve block 80, which passage communicates with the recess 82 previously described. The left hand end of the cylinder 57 is similarly connected through a pipe 97 to a cross passage 98, leading to annular ports in an upper cylinder 100 and a lower cylinder 101 in the valve block 80.

Admission of oil or other liquid under pressure through the pipe 95 to the right hand end of the cylinder 57 will give the cross feed pawl 53 an operative movement, and admission of oil under pressure to the pipe 97 will give the piston 58 and feed pawl 53 a return movement.

Ports 102 and 103 connect the pressure chamber 84 (Fig. 5) to the lower cylinder 101, and ports 104 and 105 connect the chamber 79 to the upper cylinder 100. A port 106 similarly connects the chamber 82 to the upper cylinder 100. Additional cross passages 107, 108 and 109 connect the upper and lower cylinders 100 and 101 to each other.

The lower cylinder 101 is provided with exhaust ports 110 and 111, and the upper cylinder 100 is provided with an exhaust port 112, all connected to an exhaust or return pipe 114 by which the oil or other liquid is returned to a reservoir or supply tank 115 (Fig. 1), from which it is again drawn into the pump P through a feed pipe 116.

The upper cylinder 100 in the valve block 80 is provided with a piston rod 120 connected to the arm 37 (Fig. 4) previously described and controlled in position by the reversing dogs 31 and 32. Pistons 121, 122, 123 and 124 are mounted in spaced relation on the valve rod 120 and collectively constitute an automatically controlled reversing valve.

The lower cylinder 101 is provided with a valve rod 130 connected to an arm 131 (Fig. 1) on a cross shaft 132 having a handle 133 (Fig. 2) at its outer end, by which the position of the piston rod 130 may be varied. The piston rod 130 is provided with pistons 135, 136, 137 and 138 mounted in spaced relation and collectively forming a speed control valve, manually adjustable by means of the handle 133.

Automatic or manual shifting of the upper or reversing valve causes a reversal in direction of movement of the ram 27, and manual movement of the lower or speed control valve causes the ram 27 to operate at high speed or low speed or to come to rest at any point in its path of movement.

The pump P supplies oil or liquid under pressure continuously to the lower or pressure chamber 84 in the valve block 80.

*High speed forward operation*

Having described the details of construction of my improved hydraulic actuating mechanism as embodied in a shaper, I will now describe the operation thereof.

Assuming that a forward or cutting stroke at high speed is to take place, both the reversing valve and the speed control valves will be moved to the left hand position indicated in Fig. 9. In this position, the pressure chamber 84 will be connected through the port 103, cross passage 109, and port 106 to the chamber 82, and through the pipe 81 to the right hand end of the cylinder 63. At the same time, the left hand end of the cylinder 63 is connected through the pipe 78 to the chamber 79 in the valve block 80, and this chamber 79 is connected through the port 105 and cross passage 108 to the lower cylinder and thence through the cross passage 109 and pipe 81 back to the right hand end of the cylinder 63.

A movement of the piston 64 to the left displaces the oil in the left hand end of the cylinder 63 and causes it to circulate around through the various described connections back to the right hand end of the cylinder. The amount of oil necessary to be added to the system to advance the piston a full stroke to the left is the difference in volume between the right hand and left hand ends of the cylinder, which is approximately one-half of the total volume of the cylinder.

Consequently the delivery of a given amount of oil from the pump to the system will produce approximately twice as much travel of the piston and tool as would be produced if the oil in front of the piston was delivered to the storage reservoir instead of being returned to the operating circuit. At a given rate of oil delivery, the piston and tool travel twice as fast but with less power.

As soon as oil under pressure is admitted to the chamber 82 (Fig. 9), a portion of this oil flows through the pipe 95 to the right hand end of the cross feed cylinder 57, advancing the piston 58 to actuate the cross feed. The return from the left hand end of the cylinder 57 flows through the pipe 97 to the cross passage 98 and escapes through the annular enlargement of the port 102 to the pressure chamber 84. While the oil pressures in the pipes 95 and 97 are thus equal, the feeding stroke of the piston 58 is effected by the much larger area of the right hand end of the piston.

As soon as oil under pressure is delivered through the pipe 81 to the right hand end of the cylinder 63, a portion of this oil flows through the small axial passage 65 to the pipe 67 and thence to the right hand end of the tool feed cylinder 48, advancing the piston 49 against the resistance of the spring 50 and giving the tool a downward movement.

It will be noted that these feeding strokes take place as soon as oil under pressure is admitted to the chamber 82 and pipe 81. On account of the small size and relatively slight resistance of the pistons 49 and 58, the feed takes place before the ram 27 is fairly under way.

While the connections described enable me to operate both the cross feed and the tool feed at the beginning of each operative movement of the ram, the simultaneous operation of both feeds is not usually desired. Either feed may be rendered inoperative by throwing over the feed pawls to inoperative position, so that either the tool feed or the cross feed may be used separately, or both pawls may be disabled while the feed is accomplished manually.

Reverse movement

Figure 10:
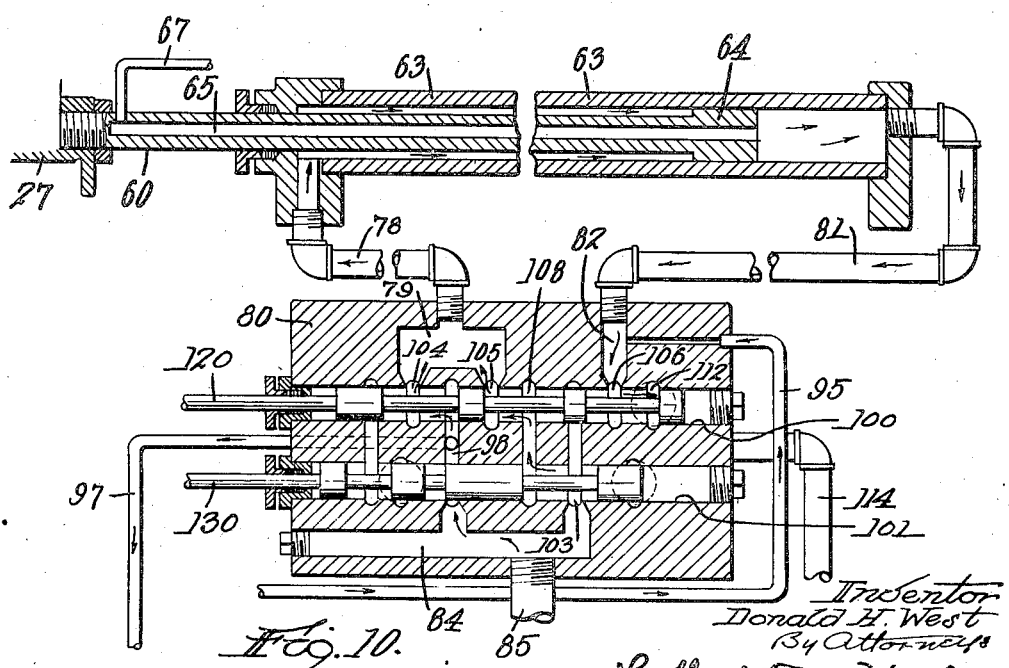

At the end of the operative stroke, the upper and reversing valve 120 is moved by the dog 32 to the position shown in Fig. 10, in which oil from the pressure chamber 84 flows through the port 103, cross passage 108, and port 105 to the chamber 79 and thence through the pipe 78 to the left hand end of the cylinder 63. At the same time, the right hand end of the cylinder 63 is connected through the pipe 81, chamber 82 and port 106 to the exhaust port 112, through which the oil at the right of the piston escapes to the exhaust pipe 114.

The chamber 79 is also connected through the port 104 and cross passage 98 to the pipe 97 which connects to the left hand end of the cross feed cylinder 57, while the pipe 95 connects the right hand end of the cylinder 57 through the chamber 82 to the exhaust 114, as previously described. The piston 58 is thereby returned to initial position.

Similarly, the tool feed cylinder 48 is connected through the pipe 67 and axial passage 65 to the right hand end of the cylinder 63, which is connected to the exhaust as previously described. Consequently the spring 50 in the cylinder 48 is effective to cause a return of the piston 49 and tool feed pawl 45 to initial position.

As the full delivery of the pump is delivered against the reduced area of the left hand face of the piston 64, the return of the ram and tool is accomplished at relatively high speed.

Slow speed forward operation

Figure 11:
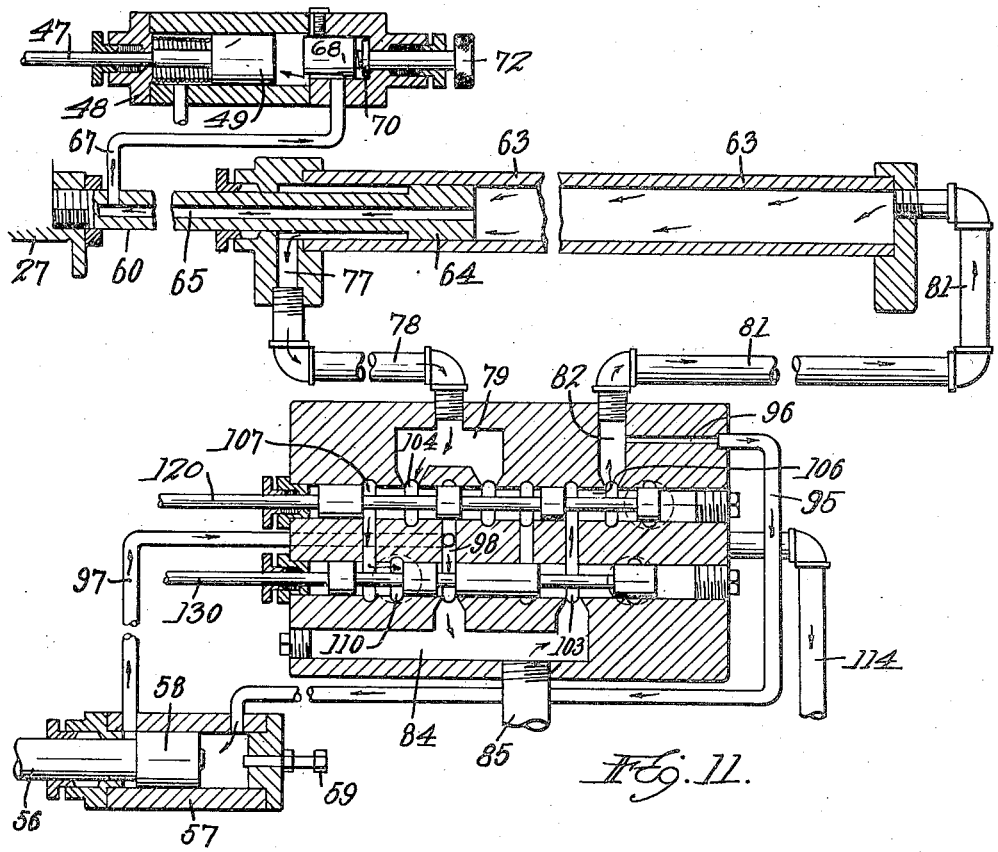

In Fig. 11 I have shown the valve positions for a slow speed forward stroke at increased power. The upper or reversing valve is shown in its left hand or forward position, as in Fig. 9 previously described, but the lower or speed control valve is shown in its mid-position.

Oil from the pressure chamber 84 flows through the port 103, cross passage 109 and port 106 to the chamber 82, and through the pipe 81 to the right hand end of the cylinder 63. The left hand end of the cylinder is connected through the pipe 78, chamber 79, port 104, cross passage 107 and exhaust port 110 to the exhaust pipe 114. Consequently there is no transfer of oil from one side of the piston 64 to the other, and the pump operates directly to move the piston 64 by filling the right hand end of the cylinder. The movement of the piston 64 and ram 27 is at a slower rate but with greater power than when the valves are arranged for high speed operation as shown in Fig. 9 and previously described.

The cross feed and tool feed connections are the same as in Fig. 9 and operate in the same way to give a feeding stroke of either or both of these devices at the very beginning of the movement of the ram.

Return movement

Figure 12:
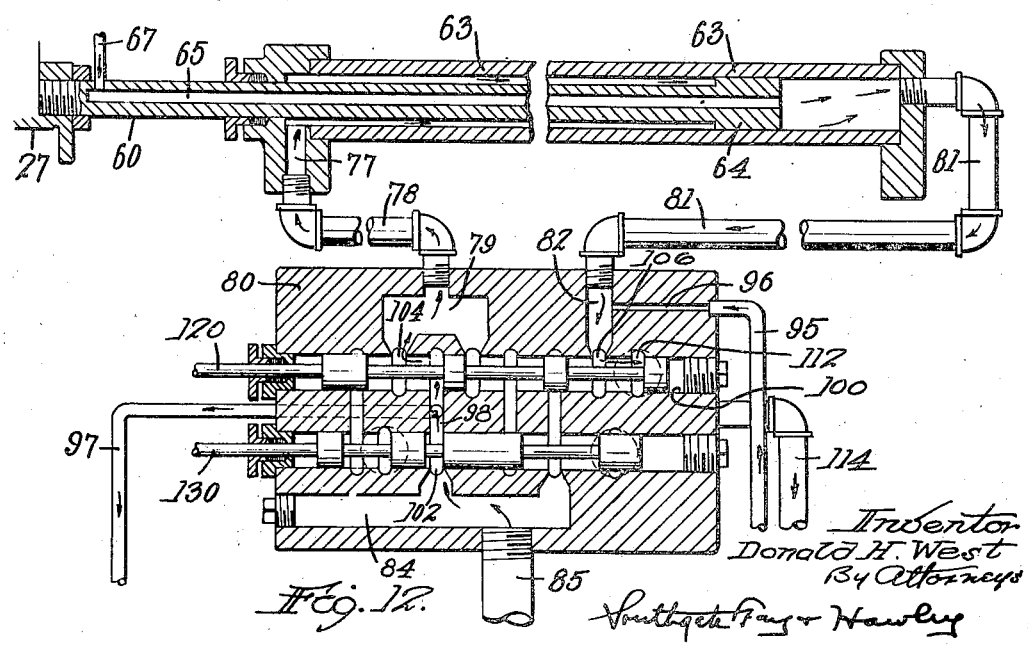

In Fig. 12 I have shown the valve positions for a return movement after a slow speed cutting stroke. The lower valve remains in mid-position, as in Fig. 11, but the upper or reversing valve is shifted to its right hand position. The pressure chamber 84 is now connected through the port 102, cross passage 98 and port 104 to the chamber 79 and through the pipes 78 to the left hand end of the cylinder 63, while the right hand end of the cylinder is connected through the pipe 81, chamber 82 and ports 106 and 112 to the exhaust pipe 114.

The connections to the tool feed and cross feed cylinders are as previously described in connection with the high speed return shown in Fig. 10.

As the full flow of the pump is delivered against the reduced left hand side of the piston 64, while the right hand end of the cylinder 63 is directly connected to the exhaust, the return movement will be at the same high speed as the return after a high speed cutting stroke.

Neutral position

If the lower or speed control valve is moved to its right hand position, as shown in Figs. 5 and 8, the piston 64 and ram 27 will be immediately stopped in any position they may then chance to occupy. If the ram is moving forward when the feed control valve is shifted to neutral position, the conditions are as indicated in Fig. 8.

The pressure chamber 84 will be connected through the ports 103 and 111 direct to the exhaust pipe 114, thus by-passing the discharge of the pump P. The pressure chamber 84 remains connected to the right hand end of the cylinder 63 through the cross passage 109, chamber 82 and pipe 81. Exhaust from the left hand end of the cylinder 63 is prevented, due to the fact that the exhaust connections from the chamber 79 are closed by the piston 122 of the upper or reversing valve and by the pistons 135 and 137 of the lower or speed control valve. Consequently no further forward movement of the ram or tool can take place, even if some slight pressure is exerted against the right hand face of the piston 64.

If the ram 27 is moving rearward when the lower or feed control valve is shifted to neutral position, as indicated in Fig. 5, the pressure chamber 84 is again connected through the ports 103 and 111 to the exhaust pipe 114. The right hand end of the cylinder 63 is connected through the chamber 82 and ports 106 and 112 to the exhaust pipe 114. There is no connection to the left hand end of the cylinder 63 except through the restricted annular enlargement of the port 102 and through the cross passage 98. This connection is so restricted that no effective pressure can be exerted against the left hand face of the piston 64, in view of the fact that the pressure chamber 84 is directly and freely connected to the exhaust.

Consequently, the piston 64 and the ram 27 remains in fixed position whenever the lower or speed control valve is moved to the neutral position indicated in Figs. 5 or 8.

*Conclusion*

Having described the details of construction and operation of my improved hydraulic actuating mechanism as applied to a shaper, it will be evident that this improved mechanism enables me to move a ram or other member in one direction at either high or low speed, and also to automatically reverse the movement and to return the member at high speed to initial position, all without variation in the speed or output of the pump.

I am also able to stop the machine at any desired point of its stroke when moving in either direction, simultaneously by-passing the output of the pump.

Furthermore, the changes in connections between high speed and low speed operation are such that the same output of the pump is utilized to produce a high or a low speed movement of the ram and the load on the pump remains substantially constant. The power of the ram is varied inversely to the speed.

In other words, by shifting the speed control valve I obtain an effect in a hydraulically operated machine which is analagous to the use of back gears in a gear driven machine.

Having thus described my invention and the advantages thereof, I do not wish to be limited to the details herein disclosed, otherwise than as set forth in the claim, but what I claim is:—

In a machine having a reciprocating member and an actuating mechanism therefor including a cylinder and piston by which all movements of said member are effected and said piston having a piston rod extending out through one end only of said cylinder, in combination, means to supply liquid under pressure and at a constant rate to said cylinder, and control valve mechanism including a speed control valve, a reversing valve, and liquid-conducting connections between said valves and said cylinder, said reversing valve being located in said connections between said speed control valve and said cylinder, said control and reversing valves being movable to different positions and thereby establishing different liquid circuits through said connections between said valves and the two ends of said cylinder, said control and reversing valves in one position connecting the two ends of said cylinder and effecting a working stroke of said reciprocating member in one direction at a relatively high speed by delivery of liquid under pressure to said cylinder at a constant rate, and said control and reversing valves in a second relative position connecting the piston rod end of said cylinder to the exhaust and effecting a working stroke of said reciprocating member at a relatively low speed in the same direction by delivery of liquid to said cylinder at the same rate, and said control and reversing valves in a third relative position connecting the piston rod end to the pressure supply and the pressure end to the exhaust and effecting return movement of said reciprocating member by delivery of liquid to said cylinder at the same rate.

DONALD H. WEST.